J. C. LARSEN.
BRAKE MECHANISM FOR SIX WHEEL TRUCKS.
APPLICATION FILED AUG. 7, 1918.
1,319,877.
Patented Oct. 28, 1919.
3 SHEETS—SHEET 1.
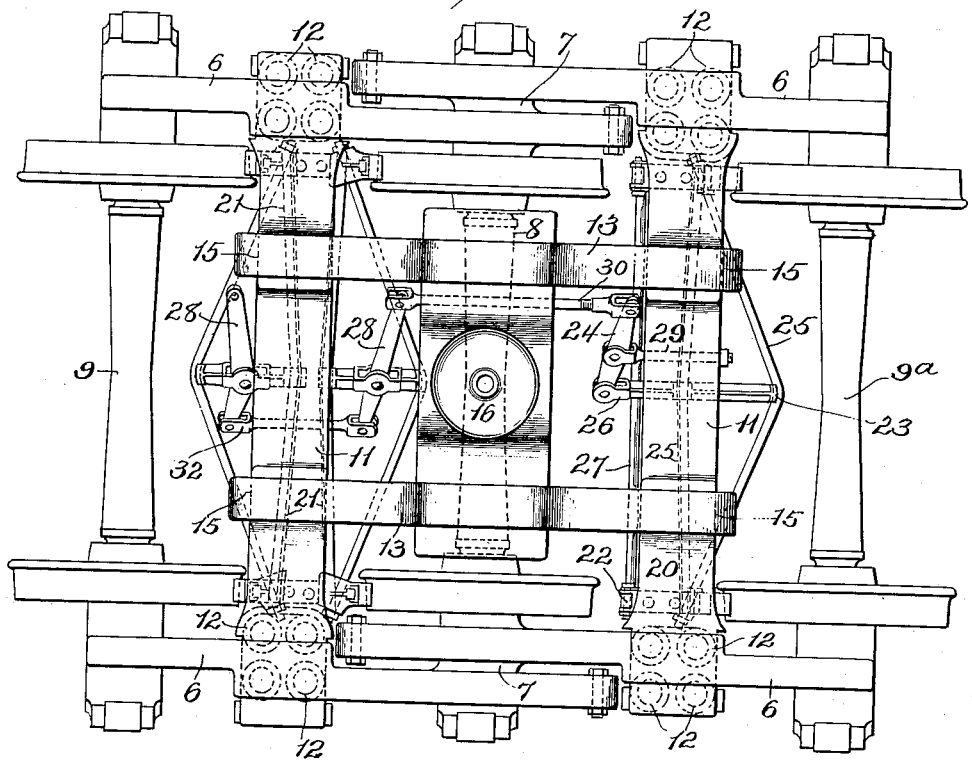
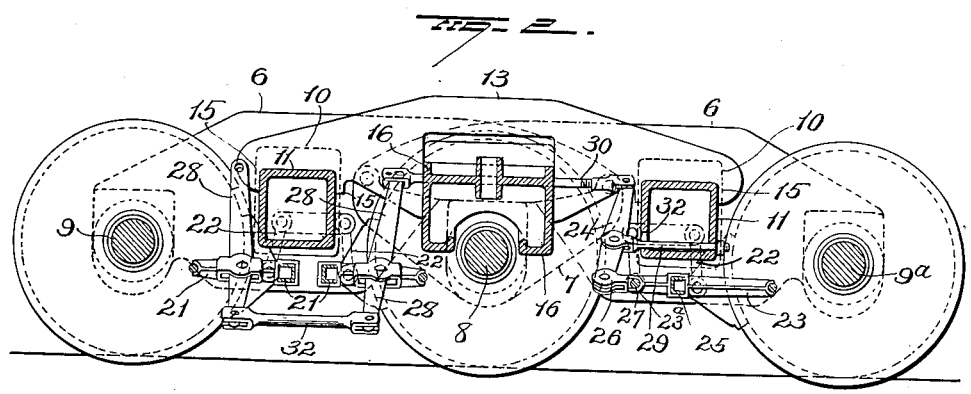

J. C. LARSEN.
BRAKE MECHANISM FOR SIX WHEEL TRUCKS.
APPLICATION FILED AUG. 7, 1918.
1,319,877.
Patented Oct. 28, 1919.
3 SHEETS—SHEET 2.
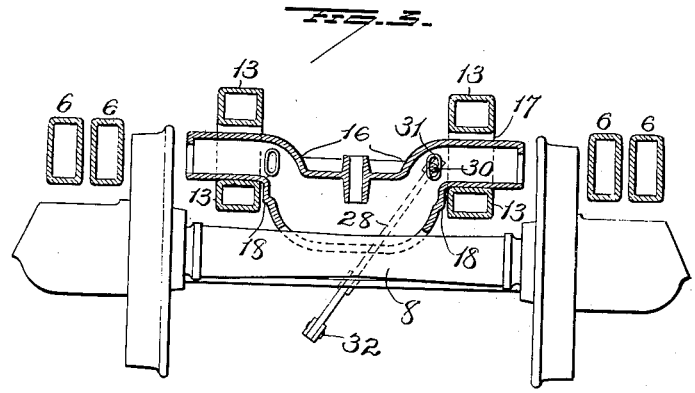
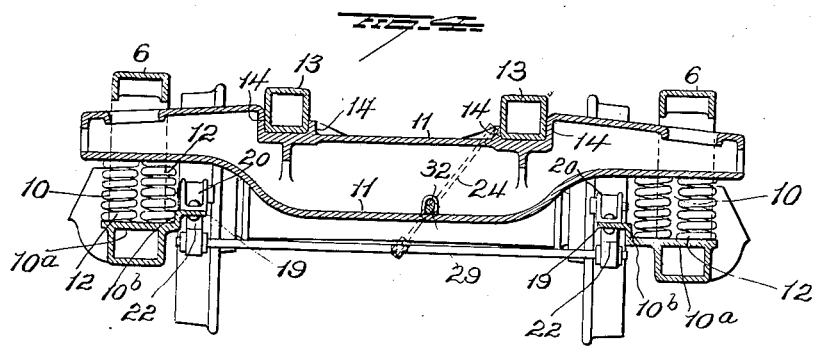

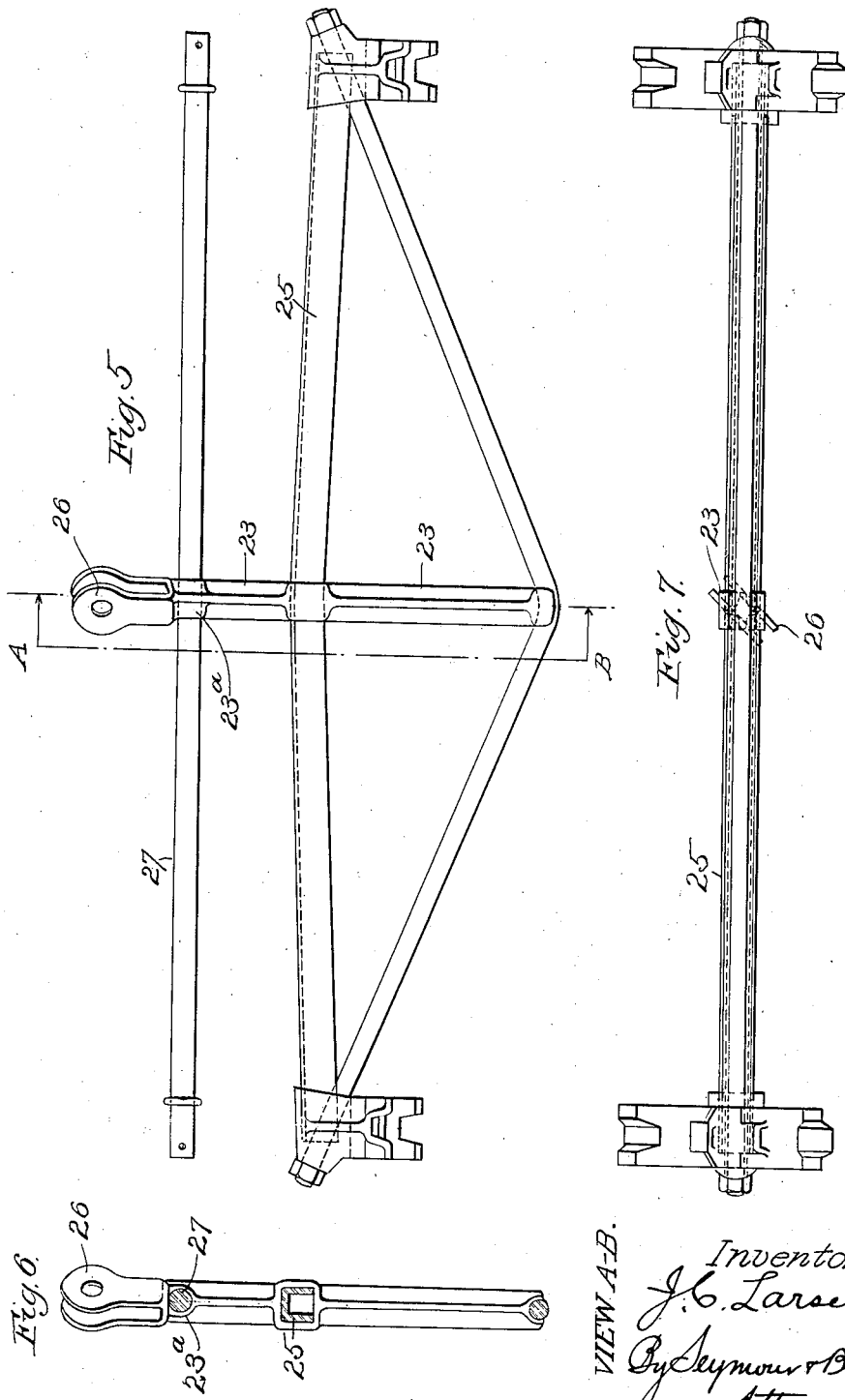

UNITED STATES PATENT OFFICE.

JACOB C. LARSEN, OF COLUMBUS, OHIO, ASSIGNOR TO THE BUCKEYE STEEL CASTINGS COMPANY, OF COLUMBUS, OHIO.

BRAKE MECHANISM FOR SIX-WHEEL TRUCKS.

1,319,877.

Specification of Letters Patent. Patented Oct. 28, 1919.

Original application filed April 1, 1918, Serial No. 226,032. Matured into Patent No. 1,298,228. Divided and this application filed August 7, 1918. Serial No. 248,753.

*To all whom it may concern:*

Be it known that I, JACOB C. LARSEN, a subject of the King of Denmark, and a resident of Columbus, in the county of Franklin and State of Ohio, have invented certain new and useful Improvements in Brake Mechanism for Six-Wheel Trucks; and I do hereby declare the following to be a full, clear, and exact description of the invention, such as will enable others skilled in the art to which it appertains to make and use the same.

This invention relates to an improvement in brake mechanism for six wheel trucks and is a division of application Serial No. 226,032 filed by me April 1st, 1918.

The object of the invention is to provide a simplified arrangement of brake levers in combination with a brake beam of improved construction whereby the brake pressure on all brakes will be simultaneously equalized.

With this object in view my invention consists in connecting a transverse rod to the brake beam and supporting the rod on oppositely disposed hangers.

It further consists in providing the brake beam with a rod extending lengthwise the beam and supporting the opposite ends of the beam and rod on independent hangers.

In the accompanying drawings, Figure 1 is a view in plan of a truck embodying my invention; Fig. 2 is a view in longitudinal vertical section, the brake levers being in elevation; Fig. 3 is a view in vertical transverse section through the main bolster; Fig. 4 is a view in vertical transverse section through one of the auxiliary bolsters. Fig. 5 is a view in plan of the brake beam; Fig. 6 is a view in section on the line A, B, of Fig. 5 and Fig. 7 is an edge view of Fig. 5.

The invention is applicable for use with various types of six wheel trucks, and while I have illustrated this improvement in connection with the side frames used in truck design, patented to George T. Johnson and myself No. 1,253,842 dated January 15th, 1918, I have done so for the purpose of illustration only and not with the intention of limiting its application to such side frame or any other particular construction of side frame.

6 represents the truck side frames, there being two to each side, with their adjacent ends overlapping as shown in Fig. 1, for the connection therewith of the frames 7 carrying the bearings for the center axle 8. Each side frame 6 has a bearing for a journal of an end axle, and each is also provided with an opening 10 for the reception of one end of a transverse or auxiliary bolster 11, each bolster 11 being yieldingly supported adjacent its ends, on springs 12 (shown in dotted lines Fig. 1) seated within the openings 10. The transverse bolsters 11 are located as shown, one between the front and middle axles, and the other between the rear and middle axles, and support the longitudinal bolsters 13, each of the latter having bearing at its ends on the transverse bolsters 11, between the shoulders 14 on the latter as shown in Fig. 4, and each of said longitudinal bolsters 13 is provided with the shoulders 15, which prevent their endwise movement on the transverse bolster 11.

The main bolster 16, is in the present instance, located over the central axle 8, and is supported at its opposite ends in openings 17 in the two longitudinal bolsters 13 (see Fig. 3), and is held against endwise displacement by the shoulders 18 which bear against the inner faces of the longitudinal bolsters 13. With this construction the weight of the center bolster 16 and the load thereon, will be sufficient to retain the bolsters in position without further securing devices other than the shoulders or lugs previously referred to.

Cast integral with the side frame 6, and with the upper edge of the upwardly projecting flanges 10$^b$ at the inner edges of the spring seats 10$^a$ are the shelf brackets 19. These brackets extend inwardly, horizontally in a plane slightly above the spring seats 10$^a$, and are reinforced by the flanges 10$^b$ all being cast integral as shown. These brackets 19 are located in a plane between the wheels as shown in Fig. 4, and form supports for the brake hanger brackets 20, which may also be cast integral with the shelf brackets 19, but I prefer the construction shown wherein the hanger brackets 20 are riveted to the shelf brackets 19, as this latter construction greatly simplifies the operation of casting the side frame.

The brake beams 21, located between the middle axle 8 and the end axle 9, are of the usual trussed type, suspended by brake hangers 22 pivotally secured to the opposite ends of the hanger brackets 20, the lower ends of the hangers 22 being attached to the brake heads.

A third brake beam located between the middle axle 8 and the end axle 9$^a$, is of similar trussed type, but the strut 23 which carries the pivot for the brake lever 24, is extended inwardly beyond the compression member 25, and is provided at its extreme inner end with a jaw 26 for the pivotal attachment thereto of the brake lever 24. This brake beam is suspended from two pairs of hangers 22, one hanger at each side being connected with the brake beam heads, and the second hanger at each side being connected to the transverse beam 27, which as shown in Figs. 5 and 6 passes at 23$^a$ through the strut 23. The brake hangers 22 carrying the beam 27, are of the same length as those which suspend the brake beam, hence by properly locating the suspension point 23$^a$, with relation to the pivots connecting the hangers and brake heads, a parallel movement in a horizontal plane will be imparted to the brake beam.

The brake beams 21 are actuated by the lever 28, disposed diagonally as shown in Fig. 1, so that their upper ends are at one side of the center line of the truck, and all connections between the levers and the rod from the brake actuating mechanism, are at one side and in a plane above the bolsters 11, and readily accessible and clear of all parts of the truck.

The lever 24, which is between the middle axle 8 and the rear axle 9$^a$, is fulcrumed to the tension rod 29, and is connected at its lower end, as previously explained, to the strut 23, the said lever 24 being diagonally disposed as shown and connected at its upper end to the upper end of adjacent lever 28 by the tension rod 30, the latter passing through an elongated slot 31 in the main bolster 16. The tension rod 29 is loosely mounted in the transverse bolster 11 so as to be free to swing or move therein, the said bolster being slotted as at 32, to permit of movement of the bolster without effecting any change in the position of the end of said tension rod which as explained carries the lever 24.

The levers 28 are pivotally connected intermediate their ends to their respective brake beams, and are connected at their lower ends by the compression member 32, the upper end of the lever between axle 9 and adjacent transverse bolster 11 being free for the attachment thereto of the brake mechanism of the car.

With this construction, it will be seen that when a pulling stress is exerted at the upper end of the forward lever 28, the brake shoes of all three brake beams will be forced into contact with their respective wheels, and as the entire equipment is flexible and not supported by any of the parts carried by the springs, the brake pressure, will, by proportioning the levers, be the same on all the wheels.

It is evident that many slight changes might be resorted to in the relative arrangement of parts shown and described without departing from the spirit and scope of my invention. Hence I would have it understood that I do not wish to confine myself to the exact construction and arrangement of parts shown and described, but, Having fully described my invention what I claim as new and desire to secure by Letters-Patent, is:—

1. In a car truck, the combination of truck side frames, a brake beam, hangers carried by the side frame and carrying the beam, a transverse beam attached to the said brake beam and hangers also carried by the said side frames and connected with the transverse beam.

2. In a car truck, the combination of truck side frames, a brake beam, a strut secured to the beam, hangers carried by the side frame and carrying the beam, a transverse beam secured to the strut, and hangers also carried by the side frames and connected with the ends of the transverse beam.

3. In a car truck, the combination of truck side frames, a brake beam, a strut secured to the beam at the center, hangers secured to the side frame and carrying the beam, a transverse beam secured to the strut and approximately parallel with the main compression member of the beam and hangers also carried by said side frames and connected with the transverse beam at the two ends of the same.

4. In a car truck, the combination of truck side frames, a brake beam, hangers supporting the brake beam, a strut secured to the beam, a transverse beam carried by the strut and approximately parallel with the compression member of the brake beam, a hanger supporting the ends of the transverse beam, the hangers for the brake and transverse beams at each end being approximately parallel so as to impart a parallel movement in a horizontal plane to the brake beam.

In testimony whereof I have signed this specification in the presence of two subscribing witnesses.

JACOB C. LARSEN.

Witnesses:
S. H. SUMMERS,
JNO. W. ATKINSON.